(12) United States Patent
Tomatsu (10) Patent No.: US 7,876,476 B2
(45) Date of Patent: Jan. 25, 2011

(54) IMAGE FORMING APPARATUS (75) Inventor: Yoshiya Tomatsu, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1082 days.

(21) Appl. No.: 11/564,532

(22) Filed: Nov. 29, 2006

(65) Prior Publication Data

US 2007/0146809 A1    Jun. 28, 2007

(30) Foreign Application Priority Data

Nov. 29, 2005    (JP) .............................. 2005-344329

(51) Int. Cl.
*H04N 1/04* (2006.01)
(52) U.S. Cl. ...................... 358/474; 358/488; 358/1.14; 399/222; 271/147; 271/160
(58) Field of Classification Search ................ 358/474, 358/488, 1.4; 399/222.328, 107, 110, 114, 399/116, 117, 108, 222, 328; 271/147, 160, 271/162, 171
See application file for complete search history.

(56) References Cited

U.S. PATENT DOCUMENTS

| 5,194,898 | A  | * | 3/1993  | Costrop et al. ............... 358/497 |
| 5,887,226 | A  | * | 3/1999  | Taki .............................. 399/92 |
| 6,185,010 | B1 | * | 2/2001  | Watanabe .................... 358/474 |
| 6,975,814 | B2 | * | 12/2005 | Tsusaka et al. ................. 399/6 |
| 7,454,155 | B2 | * | 11/2008 | Tomatsu ...................... 399/107 |
| 7,510,181 | B2 | * | 3/2009  | Kozaki ........................ 271/171 |
| 7,551,332 | B2 | * | 6/2009  | Itoi .............................. 358/497 |
| 2001/0040707 | A1 | * | 11/2001 | Funakoshi et al. ........... 358/475 |
| 2004/0027621 | A1 | * | 2/2004  | Masuda et al. .............. 358/474 |
| 2004/0131378 | A1 | * | 7/2004  | Hattori et al. ................. 399/90 |
| 2007/0071480 | A1 | * | 3/2007  | Ishikawa ...................... 399/90 |
| 2009/0122330 | A1 | * | 5/2009  | Andoh et al. .............. 358/1.13 |
| 2009/0161177 | A1 | * | 6/2009  | Nomura ....................... 358/474 |

FOREIGN PATENT DOCUMENTS

| JP | 5-181326  | 7/1993  |
| JP | 7-281580  | 10/1995 |
| JP | 8-101546  | 4/1996  |
| JP | 10-213952 | 8/1998  |

(Continued)

OTHER PUBLICATIONS

Notificaton of Reason for Refusal for corresponding Japanese Application No. 2005-344329 mailed on Sep. 28, 2010.

*Primary Examiner*—Negussie Worku
(74) *Attorney, Agent, or Firm*—Banner & Witcoff, Ltd.

(57) ABSTRACT

An image forming apparatus includes an image carrier, a scanner unit which performs an exposure process by irradiating beams to the image carrier, a scanner supporting plate which supports the scanner unit, a pair of sidewall frames which supports both lateral ends of the scanner supporting plate, a beam structure which is disposed between the pair of sidewall frames in at least one of a front side and a rear side of the scanner unit, and a reinforcing plate which is disposed opposite to the scanner supporting plate with interposing the scanner unit therebetween and is disposed between the pair of the sidewall frames in a non-fixed state to the scanner supporting plate and the scanner unit.

4 Claims, 6 Drawing Sheets

FOREIGN PATENT DOCUMENTS

| | | |
|---|---|---|
| JP | 11-177254 | 7/1999 |
| JP | 11-258885 | 9/1999 |
| JP | 2000-068657 | 3/2000 |
| JP | 2001-154438 | 6/2001 |
| JP | 2001-166550 | 6/2001 |
| JP | 2002-214869 | 7/2002 |
| JP | 2003-307894 | 10/2003 |

* cited by examiner

IMAGE FORMING APPARATUS

CROSS-REFERENCE TO RELATED APPLICATION

This application claims priority from Japanese Patent Application No. 2005-344329, filed on Nov. 29, 2005, the entire subject matter of which is incorporated herein by reference.

TECHNICAL FIELD

Aspects of the invention relate to an image forming apparatus having a scanner unit for exposure.

BACKGROUND

An electro-photographic image forming apparatus such as a laser printer includes a scanner unit which performs an exposure process by irradiating beams to a photosensitive member (image carrier) (for example, see JP-A-8-191546). The image forming apparatus includes a body frame having a pair of lateral sidewalls. The scanner unit is disposed on a scanner supporting plate which is horizontally supported above between the pair of sidewalls. A top surface of the scanner unit is covered with a resin outer cover.

SUMMARY

When the image forming apparatus is placed on an uneven surface, the body frame may be deformed. The deformation of the body frame is transferred to the scanner supporting plate to cause deformation such as a twist. As a result, a chassis of the scanner unit may be deformed to cause deterioration in image quality such as print stains. As a countermeasure, the strength of the body frame may be enhanced. However, only addition of a component to the body frame may enlarge a size of the image forming apparatus.

Aspects of the invention provide an image forming apparatus which can accomplish enhancement in strength of a frame and ensure image quality.

DETAILED DESCRIPTION

General Overview

According to a first aspect of the invention, there is provided an image forming apparatus comprising: an image carrier; a scanner unit which performs an exposure process by irradiating beams to the image carrier; a scanner supporting plate which supports the scanner unit; a pair of sidewall frames which supports both lateral ends of the scanner supporting plate; a beam structure which is disposed between the pair of sidewall frames in at least one of a front side and a rear side of the scanner unit; and a reinforcing plate which is disposed opposite to the scanner supporting plate with interposing the scanner unit therebetween and is disposed between the pair of the sidewall frames in a non-fixed state to the scanner supporting plate and the scanner unit.

According to an second aspect of the invention, the reinforcing plate is disposed between the pair of the sidewall frames in a contactless state with the scanner supporting plate and the scanner unit.

According to a third aspect of the invention, the beam structure is in a non-fixed state to the scanner supporting plate and the scanner unit.

According to a fourth aspect of the invention, the beam structure is in a contactless state with the scanner supporting plate and the scanner unit.

According to a fifth aspect of the invention, the image forming apparatus further comprises a plurality of image carriers, wherein the scanner unit performs the exposure process by irradiating beams to the plurality of image carriers.

The beam structure is disposed between the pair of sidewall frames in at least one of the front side and the rear side of the scanner unit and the reinforcing plate is disposed opposite to the scanner supporting plate with interposing the scanner unit therebetween. Accordingly, rotational strength of the scanner unit can be enhanced without enlarging the size of the apparatus. The reinforcing plate is in a contactless state with or in a non-fixed state to the scanner supporting plate and the scanner unit. Accordingly, deformation of the reinforcing plate is not well transferred to the scanner supporting plate and the scanner unit. Thus, the deformation of the scanner unit can be prevented and the image quality can be ensured.

The beam structure is in a contactless state with or in a non-fixed state to the scanner supporting plate and the scanner unit. Accordingly, the deformation of the beam structure is not well transferred to the scanner supporting plate and the scanner unit. Thus, the deformation of the scanner unit can be prevented and the image quality can be ensured.

In a color type image forming apparatus having a scanner unit irradiating beams to a plurality of image carriers, the scanner unit requires particularly high positional precision. According to an aspect of the invention, the deformation of the scanner unit is prevented. Therefore, deterioration of image quality due to color stains can be prevented.

<Illustrative Aspects>

Hereinafter, an aspect of the present invention will be described with reference to the drawings.

(Example Structure of Laser Printer)

Figure 1:
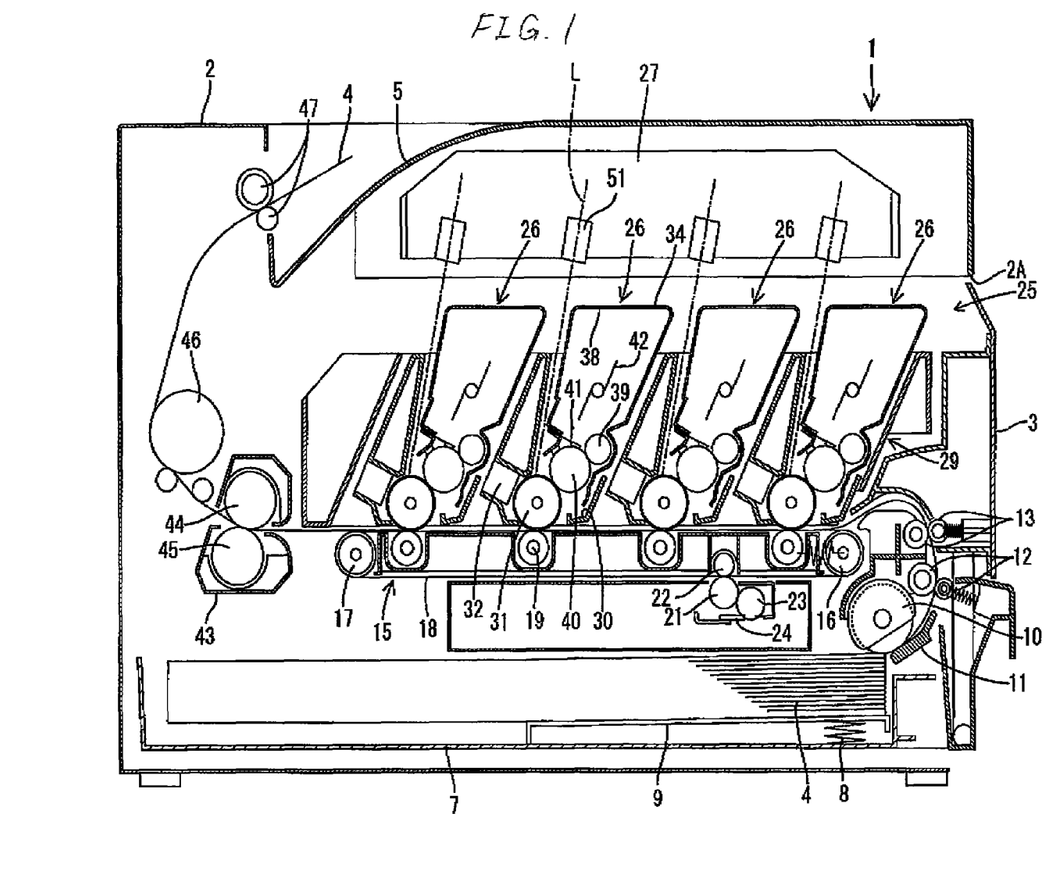
FIG. 1 is a side sectional view illustrating a laser printer according to an aspect of the invention.
Figure 2:
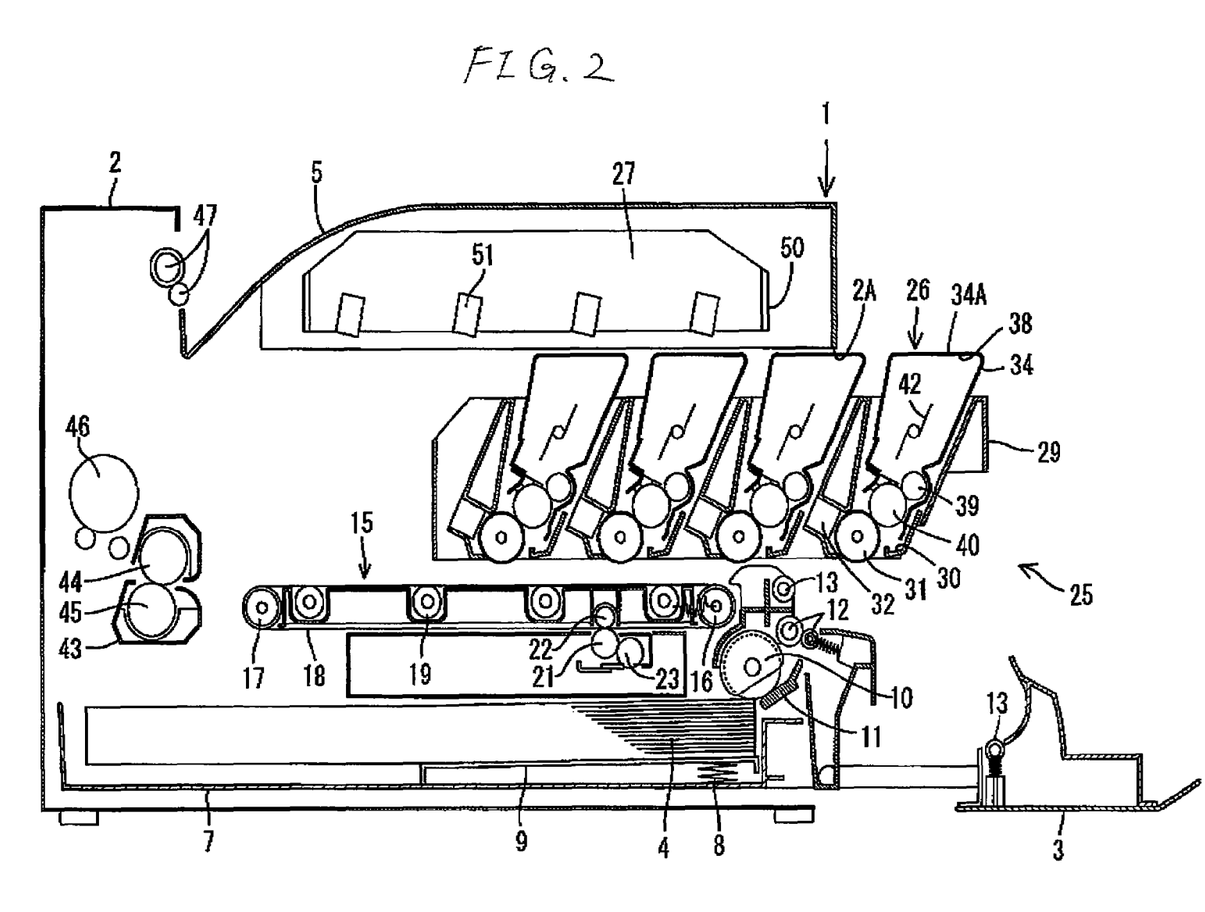
FIG. 2 is a side sectional view of the laser printer illustrating a state where a process unit is being drawn out.

FIG. 1 is a side sectional view of a laser printer 1 as an image forming apparatus according to an aspect of the invention. FIG. 2 is a side sectional view of the laser printer 1 in a state where a process unit 25 is being drawn out. In the following description, the right side in FIG. 1 denotes the front side.

The laser printer 1 is a direct transfer tandem type color laser printer. As shown in FIG. 1, the laser printer 1 includes a body casing 2 having a substantially box shape. A loading port 2A is opened on the front surface of the body casing 2, the loading port 2A is covered with a front cover 3 being opened and closed and a process unit 25 can be drawn out forwardly through the loading port 2A from the body casing 2, as shown in FIG. 2, by opening the front cover 3. A discharge tray 5, on which a sheet 4 as a printing medium having been subjected to image formation is stacked, is formed on the top surface of the body casing 2.

A sheet feed tray 7, on which the sheet 4 for forming an image is stacked, is mounted on a bottom surface of the body casing 2. A sheet pressing plate 9 is disposed in the sheet feed tray 7. The sheet plate 9 can be tilted so as to raise a leading end of the sheet 4 when a bias force of a spring 8. A pickup roller 10 and a separation pad 11 are disposed at an upper position of a front end of the sheet feed tray 7. The separation pad 11 is pressed contact with the pickup roller 10 by a bias force of a spring (not shown). A pair of feed rollers 12 is disposed on the tilted front upper side of the pickup roller 10. A pair of resist rollers 13 is disposed above the feed rollers 12.

The uppermost sheet of the sheet 4 in the sheet feed tray 7 is pressed to the pickup roller 10 by the sheet pressing plate 9. The uppermost sheet is separated sheet by sheet when it is inserted between the pickup roller 10 and the separation pad 11 by the rotation of the pickup roller 10. The sheet 4 fed out of between the pickup roller 10 and the separation pad 11 is sent to the resist rollers 13. The resist rollers 13 feed the sheet 4 onto a belt unit 15 at a predetermined time.

The belt unit 15 can be attached to and detached from the body casing 2 and includes a convey belt 18. The convey belt 18 is horizontally suspended across a pair of belt supporting rollers 16 and 17 which are disposed apart from each other in an anteroposterior direction. The convey belt 18 is an endless belt 18 formed by a resin material such as polycarbonate. The convey belt circulates in the counterclockwise direction of FIG. 1 with the rotation of the rear belt supporting roller 17 and conveys the sheet 4 placed thereon backwardly. In the convey belt 18, four transfer rollers 19 disposed opposite to photosensitive drums 31 of image forming units 26 (described later) are disposed with a constant pitch in the anteroposterior direction. Thus, the convey belt 18 is interposed between the photosensitive drums 31 and the transfer rollers 19, respectively. At the time of transfer, a transfer bias is applied across the transfer rollers 19 and the photosensitive drums 31.

A cleaning roller 21 for removing a toner or a paper dust attached to the convey belt 18 is disposed below the belt unit 15. The cleaning roller 21 has a structure that a foamed material made of silicon is disposed around a metal shaft. The convey belt 18 is interposed between a metal backup roller 22 disposed in the belt unit 15 and the cleaning roller 21. A predetermined bias is applied across the cleaning roller 21 and the backup roller 22 to electrically attract the toner, etc. on the convey belt 18 toward the cleaning roller 21. A metal collection roller 23 for removing the toner, etc. attached to the surface of the cleaning roller abuts on the cleaning roller 21. A blade 24 for scraping off the toner, etc. attached to the surface of the collection roller 23 abuts on the collection roller 23.

A scanner unit 27 is disposed in the upper portion of the body casing 2. A process unit 25 is disposed below the scanner unit. The belt unit 15 is disposed below the process unit 25.

Although not shown in detail, the scanner unit 27 includes four laser light-emitting portions, a polygon mirror, a scanner motor, a plurality of lenses and reflective mirrors in a flat box-shaped chassis 50. Four irradiation lenses 51 are provided on a bottom surface of the chassis 50. Color laser beams L emitted from the four laser light-emitting portions on the basis of predetermined image data are incident on the polygon mirror driven to rotate by the scanner motor at different incident angles through the lenses and reflective mirrors. The reflected laser beams L are emitted externally from the light lenses 51 and are irradiated to the surfaces of the photosensitive drums 31.

The process unit 25 includes four image forming units 26 corresponding to magenta, yellow, cyan, and black. The image forming units 26 are arranged in parallel in an anteroposterior direction. Each image forming unit 26 includes a photosensitive drum 31 as an image carrier, a scorotron type charger 32, and a developing cartridge 34 as a developing unit. The process unit 25 includes a process frame 29 having four cartridge mounting units 30 disposed in parallel in the anteroposterior direction. Each cartridge mounting unit 30 is mounted with the corresponding developing cartridge 34. The corresponding developing cartridge 34 can be attached to and detached from the cartridge mounting unit 30 in a state where the process frame 29 is drawn forwardly from the loading port 2A. In the process frame 29, the photosensitive drums 31 of the image forming units 26 are held at the lower end positions of the cartridge mounting units 30. The scorotron type charging units 32 are held adjacent to the photosensitive drums 31.

Each photosensitive drum 31 includes a grounded metal drum body. The uppermost layer of the drum body is covered with a positively charged photosensitive layer which is made of polycarbonate or the like.

The scorotron type charger 32 is disposed opposite to the photosensitive drum 31 with a predetermined gap. Thus, the scorotron type charger 32 does not contact with the photosensitive drum in the tilted rear upper portion of the corresponding photosensitive drum 31. The scorotron type charger 32 uniformly charges the surface of the photosensitive drum 31 with positive charges by generating corona discharge from a charging wire (not shown) made of tungsten or the like.

The developing cartridge 34 has a substantially box shape. Toner receiving chambers 38 are disposed in an upper portion of the inside of the developing cartridge 34. A supply roller 39, a developing roller 40 and a thickness-control blade 41 are disposed in a lower side of the developing cartridge 34. Positively charged non-magnetic toners of yellow, magenta, cyan and black as developers are received in the toner receiving chambers 38. An agitator 42 for agitating the toner is disposed in each toner receiving chamber 38.

The supply roller 39 has a structure in that a metal roller shaft is coated with a conductive foam material. The developing roller 40 has a structure that a metal roller shaft is coated with a conductive rubber material. The toner supplied from the toner receiving chambers 38 is supplied to the developing roller 40 with the rotation of the supply rollers 39 and is charged to a positive charge between the supply roller 39 and the developing roller 40. The toner advances between the thickness-control blade 41 and the developing roller 40 with the rotation of the developing roller 40 and is sufficiently charged therein. The toner is held on the developing roller 40 as a thin layer with a constant thickness.

The surface of the photosensitive drum 31 is uniformly charged to a positive charge by the scorotron type charger 32 at the time of rotation thereof. Thereafter, the surface of the photosensitive drum 31 is exposed to light by high-speed scanning of a laser beam L from the scanner unit 27. Thus, an electrostatic latent image corresponding to an image to be formed on the sheet 4 is formed thereon.

When the toner held on the developing roller 40 comes in contact with the photosensitive drum 31 with the rotation of the developing roller 40, the toner is supplied to the electrostatic latent image formed on the surface of the photosensitive drum 31. Accordingly, the electrostatic latent image on the photosensitive drum 31 is visualized. Further, a toner image in which the toner is attached to only the exposed portion is formed on the photosensitive drum 31.

Thereafter, the toner image formed on the surface of each photosensitive drum 31 is transferred to the sheet 4 by a negative transfer bias applied to the transfer rollers 19 while the sheet 4 conveyed by the convey belt 18 passes through transfer positions between the photosensitive drums 31 and the transfer rollers 19. The sheet 4 to which the toner images are transferred is conveyed to the fixing unit 43.

The fixing unit 43 is disposed in the back of the convey belt 18 in the body casing 2. The fixing unit 43 includes a heating roller 44 and a pressing roller 45. The heating roller has a heat source such as a halogen lamp and is rotatable. The pressing roller 45 is oppositely disposed below the heating roller 44 to press the heating roller 44 and rotates with the rotation of the heating roller. The fixing unit 43 fixes the toner images onto the sheet 4 by heating the sheet 4 holding four color toner images while interposing and conveying the sheet 4 between the heating roller 44 and the pressing roller 45. The thermally fixed sheet 4 is conveyed to a discharge roller 47 disposed in the upper portion of the body casing 2 by the convey roller 46, which is disposed on the tilted rear upper side of the fixing unit 43. The sheet is discharged onto the discharge tray 5 by the discharge roller 47.

(Structure for Supporting Scanner Unit)

Figure 3:
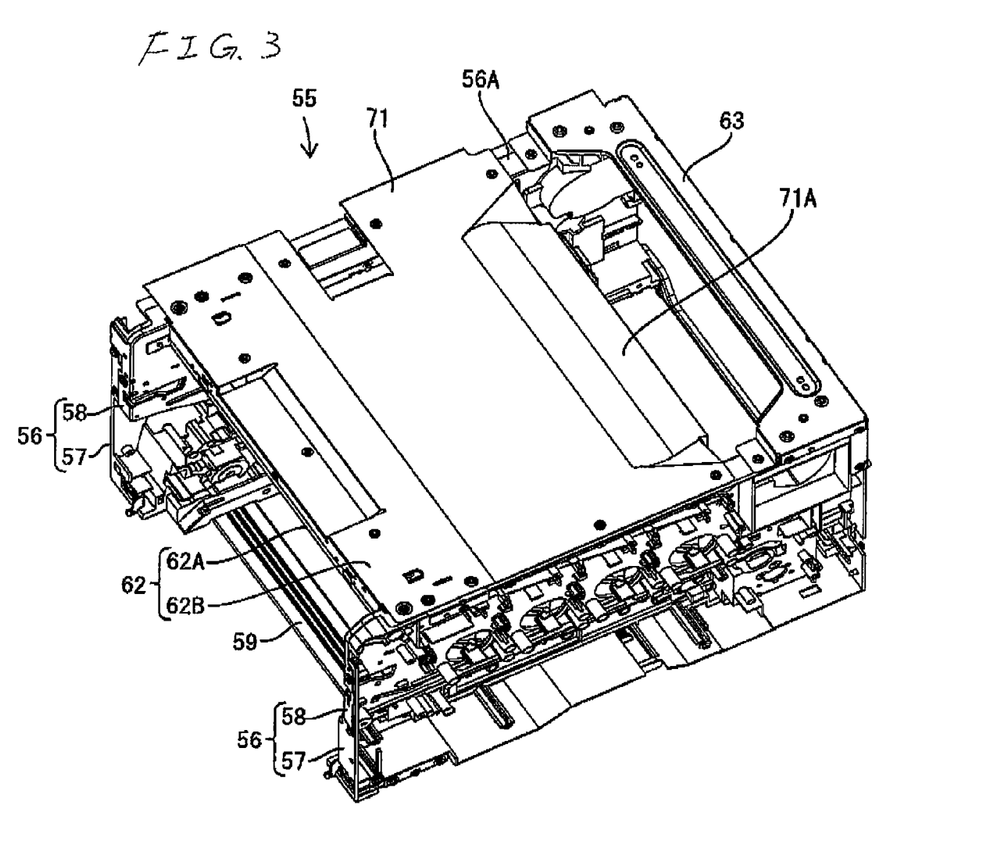
FIG. 3 is a perspective view of a body frame.
Figure 4:
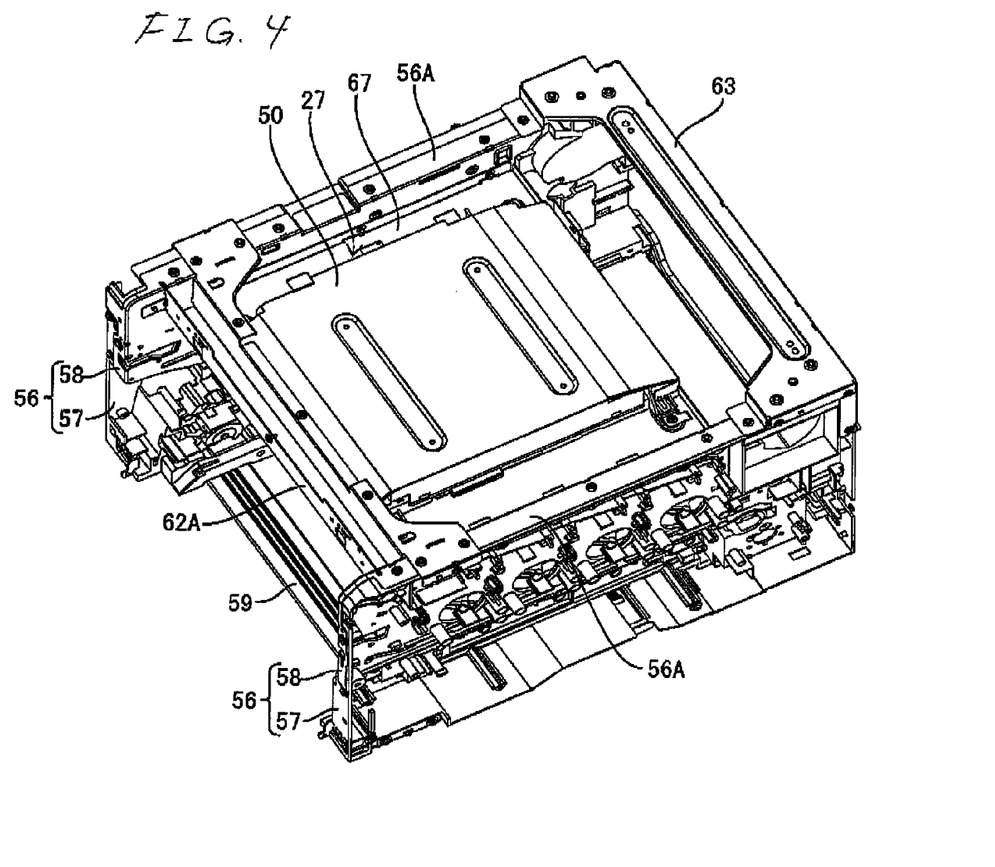
FIG. 4 is a perspective view illustrating a state where a top plate is detached from the body frame.
Figure 5:
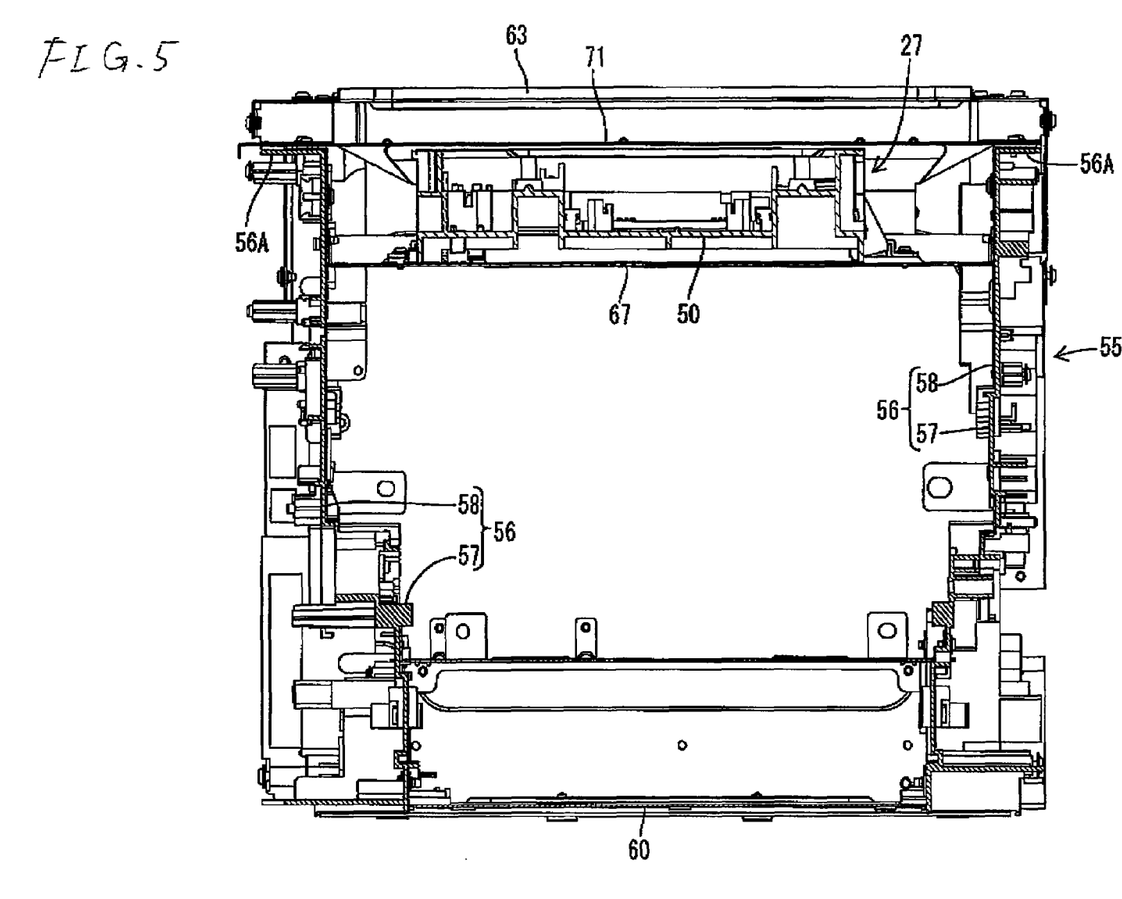
FIG. 5 is a front sectional view of the body frame.
Figure 6:
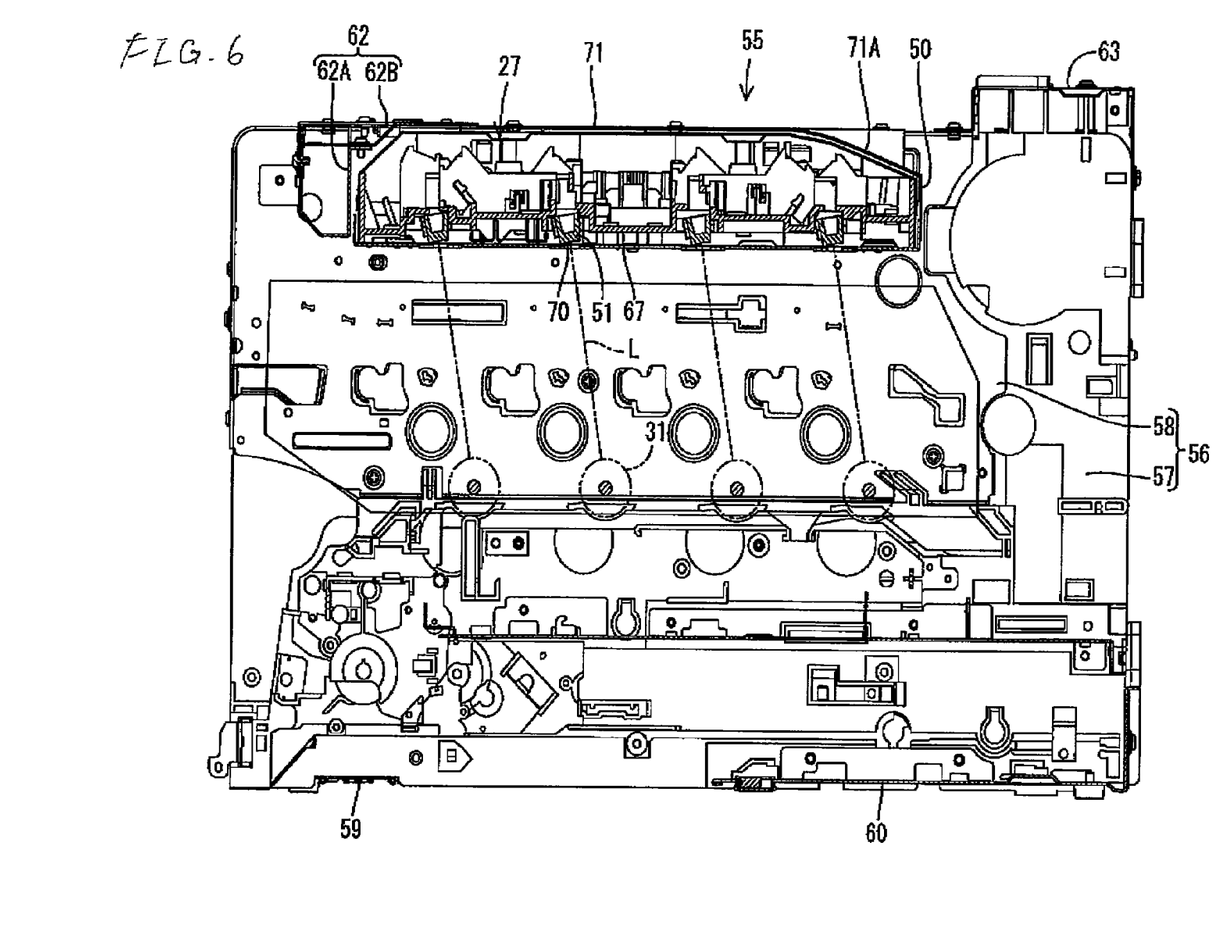
FIG. 6 is a side sectional view of the body frame.

Next, a structure for supporting the scanner unit 27 will be described in detail. FIG. 3 is a perspective view illustrating the body frame 55. FIG. 4 is a perspective view illustrating a state where top plates 62B and 71 are detached from the body frame 55. FIG. 5 is a front sectional view of the body frame 55. FIG. 6 is a side sectional view of the body frame 55.

The body casing 2 includes the body frame 55 and a resin outer cover (not shown) which covers a part of the outer surface of the body frame 55. The body frame 55 has a rectangular shape opened in the anteroposterior direction as a whole as shown in FIGS. 3 and 5 and includes a pair of sidewall frames 56. Each sidewall frame 56 includes a resin sidewall portion 57 made of a synthetic resin and a sheet metal sidewall portion 58 which is superposed on the resin sidewall portion 57 on the inner surface side of the sidewall frames 56. A metal bottom beam 59 is disposed between the sidewall frames 56 in a position close to the front end of a bottom of the body frame 55. A metal bottom plate 62 is provided in a position close to a back end of the bottom of the body frame 55.

In the top of the body frame 55, a metal front beam 62 (beam structure) is disposed at the front edge between the sidewall frames 56. The front beam 62 includes an angular pillar portion 62A and a flat top plate 62B. The angular pillar portion has a sectional shape of "⊃". The flat top plate 62B covers the surface of the angular pillar portion 62A and extends from the rear side of the angular pillar portion 62A. Both ends of the angular pillar portion 62A are screwed to the inner surfaces of the upper portions of the sidewall frames 56. Both ends of the top plate 62B are screwed to the top end surface 56A of both sidewall frames 56. A metal rear beam 64 ("beam structure") having a sectional shape of "L" is disposed at the rear end between the sidewall frames 56. The lateral ends of the rear beam 63 are screwed to the top end surface 56A of the sidewall frames 56.

Between the sidewalls 56 of the upper portion of the body frame 55, a metal scanner supporting plate 67 is horizontally disposed between the front beam 62 and the rear beam 63. The scanner supporting plate 67 has a rectangular shape and four sides thereof are bent upwardly. Both lateral ends of the supporting plate 67 are fixed to the inner surfaces of both sidewall frames 56. A chassis 50 of the scanner unit 27 is placed on the scanner supporting plate 67 and is fixed thereto with a screw. In the scanner supporting plate 67, slits 70 for transmitting the laser beam L are formed along the lateral direction at positions corresponding to the irradiation lenses 51 of the scanner unit 27. The front beam 62 is disposed in the front of the chassis 50 of the scanner unit 27 and is in a contactless state with the chassis 50 and the scanner supporting plate 67. The rear beam 63 is disposed in a tilted rear upper portion of the chassis 50 of the scanner unit 27 and is in a contactless state with the chassis 50 and the scanner supporting plate 67. Even when the front beam 62 and the rear beam 63 are not in the contactless state with the chassis 50 and the scanner supporting plate 67 but are in a non-fixed state, that is, even when they are in a contacted but non-fixed state, substantially the same advantages can be expected.

On the body frame 55, a metal top plate 71 (reinforcing plate) is disposed between the sidewall frames 56. The top plate 71 has a rectangular shape as a whole. Both lateral ends of the top plate 21 are placed on and screwed to the top end surface 56A of the sidewall frame 56. A tilted portion 71A tilted downward to the rear end along the shape of the discharge tray 5 is formed at the center of the rear portion of the top plate 71. The substantially rear halt of the top plate 62B of the front beam 62 and the top plate 71 are disposed opposite to the scanner supporting plate 67 with the scanner unit 27 therebetween and cover the top of the scanner unit 27. Both top plates 62B and 71 are slightly apart from the top surface of the chassis 50. That is, the top plates 62B and 71 are disposed in a contactless state with the scanner unit 27 and the scanner supporting plate 67. Preferably, the top plates 62B and 71 are in a contactless with the scanner unit 27 and the scanner supporting plate 67. In addition, the top plates 62B and 71 may be in a contacted but non-fixed state.

(Advantages)

According to this aspect, the front beam 62 and the rear beam 63 are disposed between the pair of the sidewall frames 56 on the front side and the rear side of the scanner unit 27. The top plate 62B, which is opposite to the scanner supporting plate 67 with interposing the scanner unit 27 therebetween, is also disposed. Accordingly, it is possible to enhance the rotational strength of the scanner unit 27 without enlarging the size of the apparatus. In addition, the top plate 71 is not fixed to the scanner supporting plate 67 and the scanner unit 27. Accordingly, the deformation of the top plate 71 is not well transferred to the scanner supporting plate 67 and the scanner unit 27. Therefore, the deformation of the scanner unit 27 can be prevented and the image quality can be ensured.

The front beam 62 and the rear beam 63 are in contactless with the scanner supporting plate 67 and the scanner unit 27. Accordingly, the deformation of the front beam 62 or the rear beam 63 is not well transferred to the scanner supporting plate 67 and the scanner unit 27. Therefore, the deformation of the scanner unit 27 can be prevented and the image quality can be ensured.

In the color type laser printer 1 having a scanner unit 27 irradiating beams to a plurality of photosensitive drums 31 like this aspect, the scanner unit 27 requires particularly high positional precision. According to an aspect of the invention, the deformation of the scanner unit 27 is prevented. Therefore, deterioration in image quality due to color stains can be prevented.

(Other Aspects)

The invention is not limited to the aspect described above with reference to the drawings, but the following aspects can be included in the technical scope of the invention.

Although the color image forming apparatus exposing a plurality of image carriers to light has been exemplified in the above aspect, the invention may be applied to a white-and-black image forming apparatus having a single image carrier.

What is claimed is:

1. An image forming apparatus comprising:
an image carrier;

a scanner unit which performs an exposure process by irradiating beams to the image carrier;
a scanner supporting plate which supports the scanner unit;
a pair of sidewall frames which supports both lateral ends of the scanner supporting plate;
a beam structure which is disposed between the pair of sidewall frames in at least one of a front side and a rear side of the scanner unit; and
a reinforcing plate which is disposed opposite to the scanner supporting plate with interposing the scanner unit therebetween and is disposed between the pair of the sidewall frames in a non-fixed state to the scanner supporting plate and the scanner unit,
wherein the reinforcing plate is disposed between the pair of the sidewall frames in a contactless state with the scanner supporting plate and the scanner unit.

2. An image forming apparatus comprising:
an image carrier;
a scanner unit which performs an exposure process by irradiating beams to the image carrier;
a scanner supporting plate which supports the scanner unit;
a pair of sidewall frames which supports both lateral ends of the scanner supporting plate;
a beam structure which is disposed between the pair of sidewall frames in at least one of a front side and a rear side of the scanner unit; and
a reinforcing plate which is disposed opposite to the scanner supporting plate with interposing the scanner unit therebetween and is disposed between the pair of the sidewall frames in a non-fixed state to the scanner supporting plate and the scanner unit,
wherein the beam structure is in a non-fixed state to the scanner supporting plate and the scanner unit.

3. The image forming apparatus according to claim 2,
wherein the beam structure is in a contactless state with the scanner supporting plate and the scanner unit.

4. The image forming apparatus according to claim 1, further comprising a plurality of image carriers,
wherein the scanner unit performs the exposure process by irradiating beams to the plurality of image carriers.

* * * * *